United States Patent
Drumheller et al.

(10) Patent No.: US 6,217,178 B1
(45) Date of Patent: Apr. 17, 2001

(54) REFLECTOR ATTACHMENT MEANS FOR SOLAR ENERGY CONCENTRATORS

(76) Inventors: Kirk Drumheller, 5015 Nicklas Pl. NE., Seattle, WA (US) 98105; David Eugene Werstler, 286 Lake Samish Rd., Bellingham, WA (US) 98226; John Frederic Williford, Jr., P.O. Box 2578, Kirkland, WA (US) 98083

( * ) Notice: Subject to any disclaimer, the term of this patent is extended or adjusted under 35 U.S.C. 154(b) by 0 days.

(21) Appl. No.: 09/454,741

(22) Filed: Dec. 6, 1999

Related U.S. Application Data

(60) Provisional application No. 60/111,338, filed on Dec. 7, 1998.

(51) Int. Cl.[7] .............................. G02B 5/08; G02B 7/182
(52) U.S. Cl. ............................................. 359/849; 359/851
(58) Field of Search .................................. 359/846, 849, 359/851, 853, 871, 883

(56) References Cited

U.S. PATENT DOCUMENTS

| | | |
|---|---|---|
| 3,906,927 | 9/1975 | Caplan . |
| 4,179,193 | 12/1979 | Gillette et al. . |
| 4,245,895 * | 1/1981 | Wildenrotter ........................ 359/848 |
| 4,251,135 | 2/1981 | Stone . |
| 4,373,783 | 2/1983 | Anderson . |
| 4,422,723 | 12/1983 | William, Jr. et al. . |
| 4,435,043 | 3/1984 | Merten et al. . |
| 4,501,469 | 2/1985 | Merges et al. . |
| 4,502,200 * | 3/1985 | Anderson et al. ................... 359/846 |
| 4,511,215 | 4/1985 | Butler . |

* cited by examiner

Primary Examiner—Cassandra Spyrou
Assistant Examiner—Mark A. Robinson

(57) ABSTRACT

A method of fabricating glass or other transparent material second surface reflectors for solar energy concentrating systems, with attachment devices affixed to the back of the mirror. The attachment devices are used to attach the reflector to a supporting frame. The silver or other reflecting material that the forms the reflecting surface is removed in a small area so the attachment device can be affixed directly to the glass or other transparent material rather than to one or more layers of reflecting materials and protective coatings. The reflecting surface of a glass mirror is usually protected by one or more layers of protective coating. This results in one or more interfaces between the glass and the adhesive used to affix the attaching device. Each interface can present an area for inconsistent bonding. Removing the reflecting surface and protective coatings thus provides for a stronger bond than might be achieved by attaching the attachment device to the protective coatings. This in turn makes possible simpler attachment devices and a more predictable and consistent bond. The stronger and more consistent bonds allow for improved focussing methods by making it easier to distort the glass to a focussing configuration.

4 Claims, 3 Drawing Sheets

REFLECTOR ATTACHMENT MEANS FOR SOLAR ENERGY CONCENTRATORS

This application claims benefit to U.S. provisional application No. 60/111,338, filed Dec. 7, 1998.

BACKGROUND

1. Field of Invention

This invention relates to attachment systems for reflecting surfaces used to concentrate solar energy.

2. Description of Prior Art

Reflecting surfaces have been used to concentrate solar energy for many decades. One of the earliest applications is said to have been the use of polished shields by hundreds of warriors to concentrate the sun on enemy sails, thereby setting fire to the ships.

A heliostat is, by definition, a reflecting surface that continuously reflects the sun to a designated or fixed point. In the technology of solar thermal energy use, heliostats are formed of single or multiple reflecting panels that are usually planar or moderately focussed, and are affixed to a moveable supporting structure. Fields of many heliostats may be used to achieve high concentrations of solar energy on a central receiver. Heliostats do not track the sun directly, but split the angle between the sun and the receiver.

In addition to the concentrating reflectors such as heliostats, parabolic troughs, and parabolic dishes, that move with the sun there are several types of solar concentrators that utilize fixed reflectors. Fixed reflectors may benefit from the attachment methods described herein.

Mirrored glass is one of the best reflectors for solar energy concentrators. Many years and many millions of dollars have been spent trying to improve on mirrored glass. However, second-surface (back-surfaced) mirrored glass remains one of the most efficient, long-lived and cost effective reflectors.

One of the problems with mirrored glass has always been attaching the glass to the support structure. Glass mirrors have usually been attached to the support structure by gluing supports to the back side of a glass sandwich, with the mirrored surface in between the two glass panels; by using a glass substrate with a front reflector surface; or by gluing supports with a large contact surface area to the backside of a second-surface mirror.

One of the principal approaches to concentrator design by these inventors has been the use of off-the-shelf components to construct the machines. This approach led to the development of a support attachment using off-the-shelf elevator bolts that are directly attached to the glass surface by means of an off-the-shelf long-lived silicone building sealant. For example, with a 30 inch×30 inch glass panel, an array of four one-quarter inch diameter elevator bolts with a one inch diameter flat head has worked very successfully. This scheme leads to a low cost, high strength fixture method with simple means of adjusting the reflecting panel on its support structure. Heliostat assemblies constructed this way have withstood extreme wind and weather for long periods of time. A potential problem with the elevator bolt approach is that with a second-surface mirror (A second-surface mirror is required to obtain the durability benefits of glass reflectors) the supports are most efficiently attached to the mirrored side of the glass.

A typical mirrored surface on glass comprises a layer of silver deposited on the glass, a protective layer of copper deposited over the silver, and a protective paint applied to the copper. Thus, the bonding of the support to the glass is only as strong as the weakest of the glass-silver, copper-silver, or paint-copper bonds. Since the foregoing bonds may be relatively weak and can vary considerably in strength, a support attachment with a large contacting surface is required to successfully attach sufficiently strong supports to the multi-layered back surface.

Years of successful testing have demonstrated that the attachment of small supports directly to the glass is a technically and economically practical way to support the glass. Recently, direct joints to glass were achieved by simply removing the paint, copper, and silver from small spots on the mirrors and attaching the supports directly to glass. A disadvantage of this method is the loss of a small amount of reflecting surface. For example, in a 30 inch by 30 inch square mirror panel, approximately four square inches of reflecting surface might be removed. This can be compensated for by adding about one sixteenth of an inch to the 30 inch length of each side. The bolt heads have been set in a sealant thickness of approximately 0.020-inch to provide resilience between the glass and bolt head.

In using a thin glass panel with this type of support, deflections in the glass may be introduced by moments on the supports. Deflections can distort the reflected image in undesirable ways. Undesirable deflections in the glass can be overcome by the use of slightly oversized holes in the support structure for all but one of the supports on an individual reflector panel, and supporting the glass panel against a specified surface jig while the supports are adjusted to provide the desired focus. The resiliency in the adhesive that is attaching the support to the reflector panel helps to prevent glass distortion from small deflections of the support.

Several methods of attaching reflecting surfaces to support structures are the subject of U.S. Patents. These include:

U.S. Pat. No. 4,435,043, Mertens, et al. This approach provides for a backing sheet attached to the reflective surface. The supports are then attached to this backing sheet. The only potential advantage of our invention over this method is simplicity.

U.S. Pat. No. 4,501,469, Merges, et al. This approach provides for focussing of the panel by means of pins attached to the reflector. The reflecting surface is not removed, hence a larger and more complex support and attachment surface are expected to be required.

Focussing within individual panels is provided for in the following patents:

U.S. Pat. No. 3,906,927, Caplan. Provides for adjusting the focus through multiple components of a panel, with some adjustment within individual panels. Does not provide for attachment of supports directly to the glass.

U.S. Pat. No. 4,179,193, Gillette. Flexible membrane stretched over a hoop structure with backing membrane stretched over opposite side. Focussed by changing pressure in the enclosed volume.

U.S. Pat. No. 437,378, Anderson. Compensates for temperature changes by having front and back sheets having the same coefficient of thermal expansion, with adhesive having shear tolerance. Does not contemplate attachment directly to the glass.

U.S. Pat. No. 4,422,723, Williams, et al. Membrane using partial vacuum to focus.

U.S. Pat. No. 4,511,215, Butler. Stretched membrane, with springs, attachment to membrane with means for changing position of attachment to change the focus.

U.S. Pat. No. 4,251,135, Stone. A flexible triangular reflector sheet under tension. Does not involve removing reflector surface to attach supports.

BRIEF SUMMARY OF THE INVENTION

The object of this invention is to provide an improved means of attaching supports to glass (or other rigid transparent material) reflector panels used in concentrating solar energy systems. The invention provides for the removal of reflector materials and protective coatings in a small area of the panel and attaching the support directly to the prepared glass. Second surface glass reflector surfaces are usually produced by applying a reflecting material such as silver or aluminum, then covering that material with one or more protective coatings. Supports attached to the protected reflective coating are thus dependent on the strength of one or more interface bonds for the strength of their bond to the reflector facet. Attaching directly to the glass surface provides for increased and more consistent bond strength. This, in turn, allows for simpler and less expensive attachment devices. It also provides for improvements in panel focussing devices.

Reference Numerals in Drawings

20 Heliostat
22 Pedestal
24 Drive
26 Support Structure
28 Rectangular Reflector Panel
30 Reflector Panel Support
31 Triangular Reflector Panel
32 Glass
34 Silver Reflector Surface
36 Copper Coating
38 Paint Coating
40 Cleaned Area
42 Adhesive
44 Support Threads
46 Support Shaft
48 Support Head
50 Cupped Support Head
52 Adjusting Nut
54 Clamping Nut
56 Small Support Structure Hole
58 Large Support Structure Hole
64 Spacing
66 Surface Jig
68 Surface Jig Clamps
70 Reflector Panel Surface

DETAILED DESCRIPTION OF THE INVENTION

Description

Typical embodiments of the reflector support attachment are shown in FIGS. 1, 2, 3, 4, 5, and 6.

Figure 1:
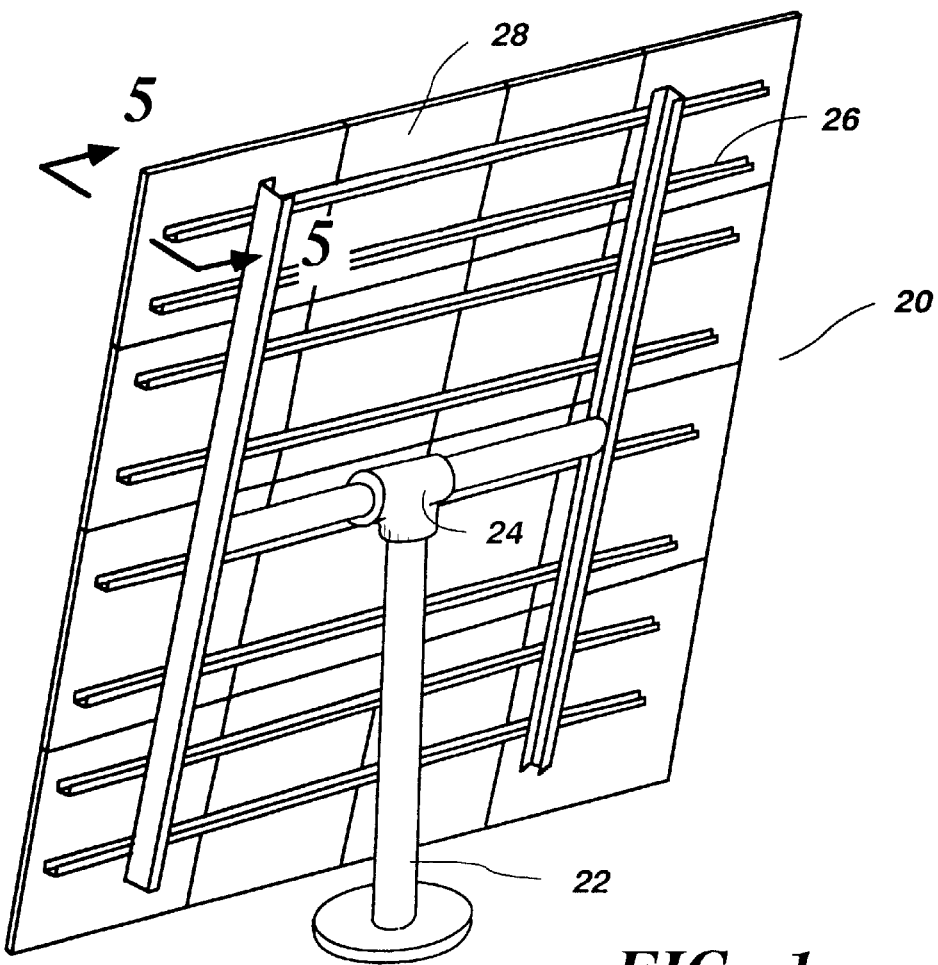
FIG. 1 is a perspective view, from the non-reflecting back side, of a heliostat with sixteen rectangular reflector panels installed.

FIG. 1 shows a heliostat 20 consisting of a pedestal 22, drive 24, support structure 26 and sixteen reflector panels 28. The support attachment described herein can be applied to other solar concentrators such as parabolic dishes, parabolic troughs, and fixed reflector concentrators, as well as to the heliostat configuration shown here.

Figure 2:
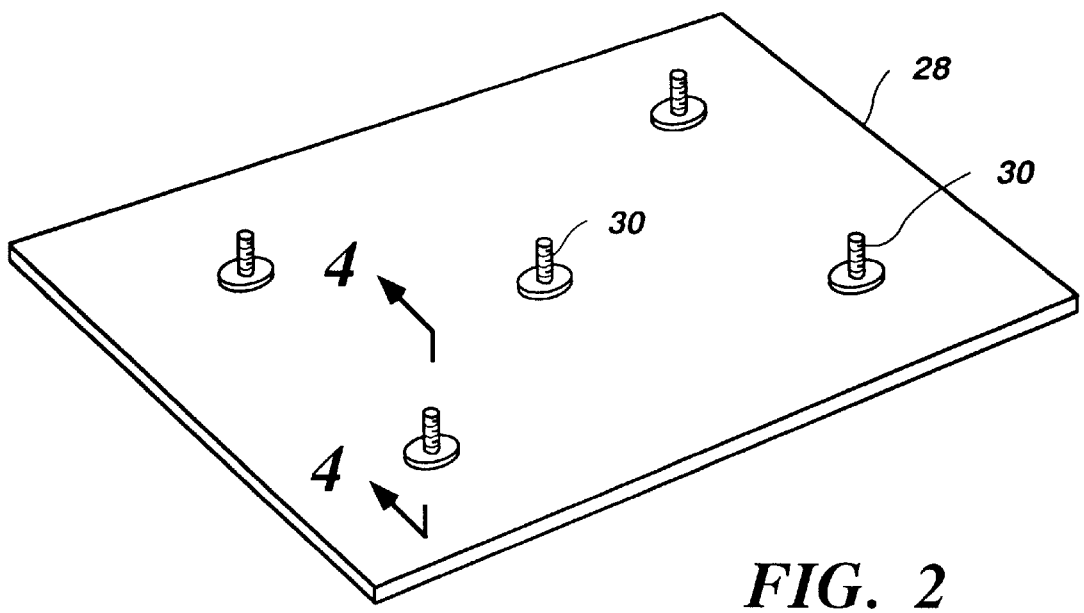
FIG. 2 is a perspective view of a rectangular glass reflector panel with supports attached.

FIG. 2 shows a reflector panel 28 with four reflector panel supports 30 attached. However, any different number of supports 30 can be used. For example, in some cases, a fifth support 30 is attached to the center of the panel 28. The support 30 at the center is attached to the support structure 26. A curvature is applied to the panel 28 by positioning the center support 30 at a different position perpendicular to the plane of the panel 28 than that of the primary supports 30, thereby providing focussing by an individual panel, as differentiated from focussing of an entire heliostat surface.

Figure 3:
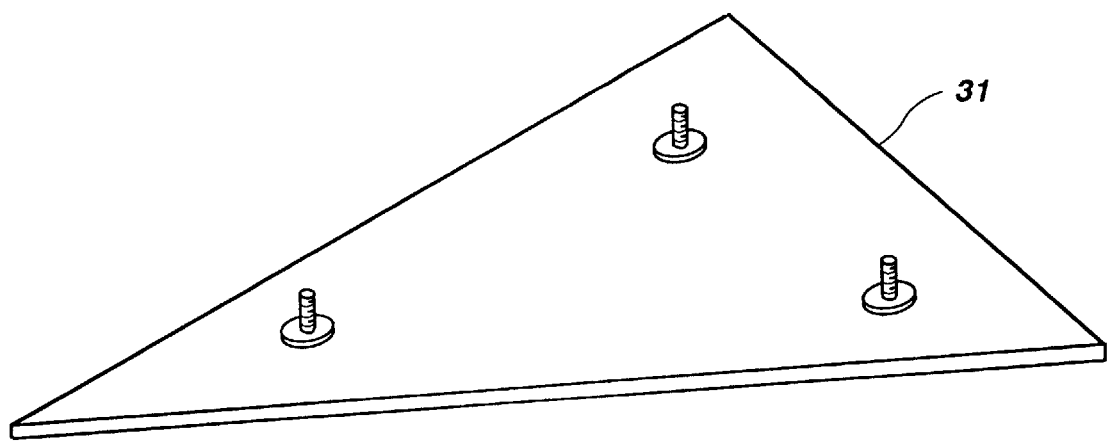
FIG. 3 is a perspective view of a triangular glass reflector panel with supports attached.

FIG. 3 shows a triangular reflector panel 31 with three reflector panel supports 30 attached.

Figure 4:
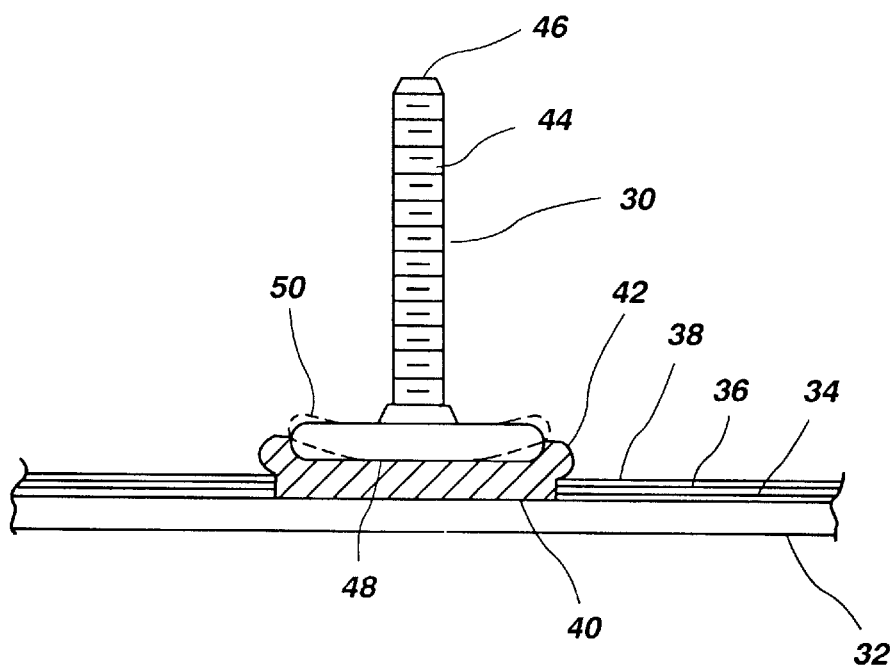
FIG. 4 is a section through 4—4 of FIG. 2.
Figure 5:
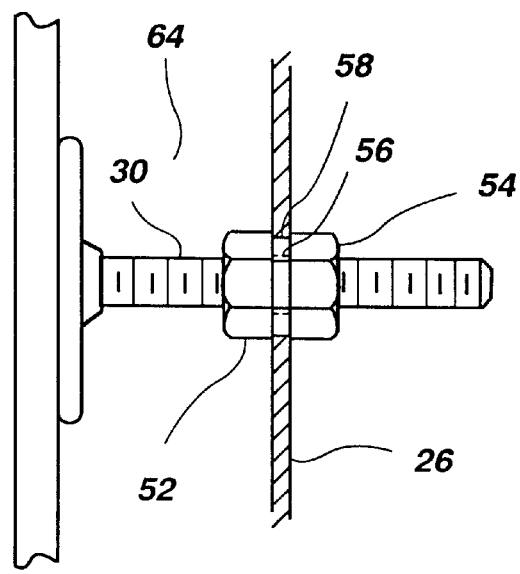
FIG. 5 is a section through 5—5 of FIG. 1, with adjusting nut and clamping nut.
Figure 6:
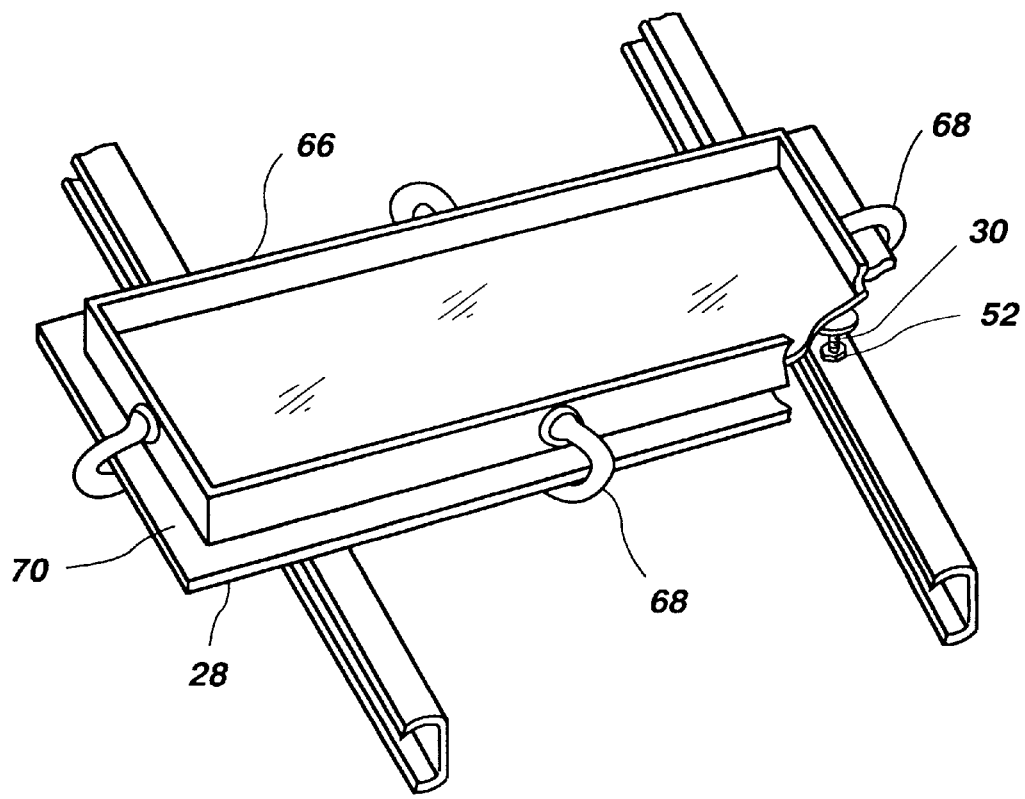
FIG. 6 is a partially sectioned perspective view of a rectangular glass reflector panel with a surface jig attached.

A preferred embodiment of our invention is illustrated in FIGS. 4, 5, and 6. FIG. 4 shows a section of the reflector panel 28 with a support 30 attached. A typical reflector panel 28 construction is illustrated in FIG. 4. The panel structure includes a glass panel 32, a coating of silver 34 which provides the reflecting surface, a protective coating of copper 36 and a protective coating of paint 38. Reflecting panels made up of different materials may be used in solar energy concentrating devices. Reflecting panels comprised of other materials may be treated in the same way as described herein. A principal objective in this embodiment is to provide a clean glass surface 40 to bond the support 30 to the glass panel 32. This results in a bond as strong as the adhesive 42 and the support 30. Bonding the support 30 directly to the protective coating 38 leads to a bond that is only as strong as the bond between any of the interfaces between the glass 32, the silver 34, and the protective coatings 36, 38. Removing all of the materials to provide a clean glass surface 40 allows the use of smaller and more cost effective supports. In FIG. 4, the mirror silver 34, the copper coating 36 protecting the silver 34, and the paint coating 38 protecting the copper 36 and the silver 34 have all been removed from the glass 32 in an area 40 slightly larger than the head of the support 30. This removal can be accomplished by mechanical or chemical means. It can also be accomplished by masking the attachment area 40 prior to applying the reflective and protective coatings 34, 36, 38 so the coatings are not applied to the attachment area 40. The support 30 is a bolt with threads 44 over all or most of its shaft 46. The support 30 has a relatively large flat head 48. The common name for this type of bolt is "elevator bolt". In the case of a one-quarter inch diameter elevator bolt, the head is usually nominally one inch in diameter. The bolt head 48 is cupped or chamfered slightly 50 to reduce stress peaking at the adhesive margin and increase shear strength. A flexible adhesive 42 with sufficient strength to bond the support 30 to the glass 32 under strong wind conditions and sufficient flexibility to maintain stress concentration within acceptable limits and reduce the transmission of bending stresses on the support 30 to the reflector panel 28, bonds the support 30 to the glass 32. An adhesive thickness of approximately 0.020 inch has provided acceptable resilience. Other thicknesses may be used. Other configurations can utilize the principles of preparing a glass surface for attachment of supports by removing the reflecting materials 34 and protective coatings 36, 38 and/or cupping or chamfering the reflecting panel support head 50. For example, a simple angle can be attached to the reflector panel by one leg and the second leg can be used to attach to the support structure. A U shaped piece can be attached to the reflector panel and the support structure can be attached to the U shaped piece. Special bolts can be used in place of the off-the-shelf elevator bolts. FIG. 6 illustrates a surface jig 66 clamped to a rectangular reflector panel 28 to retain the shape of the reflector panel 28 while it is being focussed. The surface jig 66 is configured to maintain the desired shape of the panel 28 while the focus adjusting nuts 52 are being adjusted and the clamping nuts 54 are being tightened. Surface jig clamps 68 illustrated are semi rigid shapes attached to the surface jig 66 and pressed onto the reflector panel 28. The purpose of the jig 66 is to prevent distortion of the reflector panel 28 that would result in distortion of the reflected image. The large support structure holes 58 provide freedom for the reflector panel supports 30 to move laterally in the large support structure holes 58 until the adjusting nuts 52 are positioned and the clamping nuts 54 are tightened. The freedom for lateral movement of the support shafts 46 prevents bending forces on the support structure shafts 46, which would in turn apply a bending moment to the reflector panel 28 and produce deflection in the reflector panel surface 70. The flexible adhesive 42 provides some accommodation for deflection of the support shaft 46 without imparting significant deflection to the reflector panel 28. The surface jig 66 has sufficient clear space for the reflected beam to allow for focusing of the reflector panel 28 when the surface jig 68 is applied to the front surface 70. Different configurations of the surface jig 66 and different types of clamps 68 are possible. The surface jig 66 can be configured to be clamped to the back of the panel. The surface jig clamps 68 can be of any type providing for ease and speed of use. An adjusting nut 52 is threaded onto the support shaft 46 to a distance from the head 48. The support shafts 46 of all the reflector panel supports 30 are inserted into holes in the support structure, and clamping nuts 54 are threaded onto the support shafts 46 to firmly attach the support 30 to the support structure 26. The focus point of the reflector panel 28 is adjusted by moving the adjusting nut 52 between the support structure 26 and the reflector panel 28, and tightening the clamping nuts 54 onto the opposite side of the support structure 26 against the support structure 26. Washers and lock washers or stop nuts may be used in both instances. Manufacturer's data and short term testing indicated that the off-the-shelf protection for a silver reflecting surface is adequate. However, if further field testing indicates the need for additional protection, this can be applied in the form of an additional protective coating or a protective shield such a metallic or plastic sheet. FIG. 5 illustrates the use of two different hole sizes in the support structure 26. The diameter of a single small support structure hole 56 for each reflector panel 28 is greater than the support shaft 46 diameter by an amount sufficient to provide for easy entrance of the support shaft 46, but restrict movement laterally. Large support structure holes 58 for the other supports are oversized by an amount sufficient to prevent lateral compression forces, or moment forces from the support, distorting the panel. Three large support structure holes 58 are used with a rectangular panel 28 with four supports 30 and two for a triangular panel 31 with three supports 30.

Another embodiment of our invention is shown in FIG. 3. A triangular reflector panel 31 has three supports 30 attached. The three point suspension simplifies adjustment. In the triangular reflector panel 31 embodiment, focusing of an individual reflector panel is simplified by the fact that it is easier to align a plane supported at three points than it is to align a plane supported at four points.

The cupping, convexing, or chamfering of the support head 50 illustrated in FIG. 4 can be beneficially applied to attachment systems that do not provide an attachment area 40 that is cleaned to the glass. The principle of this part of our invention can be beneficially applied to supports attached directly to the silver 34 or to protective coatings 36, 38. This principle can also be applied to glass sandwich panels or to glass used as substrate for a front surface reflecting surface, or to any other surface, to reduce stress concentrations and increase shear resistance.

Operation of The Invention

In a preferred embodiment of our invention the reflector panel supports 30 are attached to the reflector panel 28, adjusting nuts 52 are threaded onto the each of the support shafts 46. The surface jig 66 is clamped to the surface of the reflector panel. After the adjusting nuts 52 are threaded onto the support shafts 46, the shafts 46 are inserted in holes 56, 58 in the support structure. Clamping nuts 54 are applied to the opposite side of the support structure 26. The focal point of the reflector panel 28 is adjusted by adjusting positions of the adjusting nuts 52 and clamping nuts 54 on each support 30 to achieve the desired tilt of the panel 28. Clamping nuts 54 are tightened to firmly attach the reflector panel 28 to the support structure 26. Compressive stresses or moment stresses which might distort the panel are reduced or eliminated by fixing only one of the supports 30 in the planar direction of the reflector panel 28 and having slightly oversized holes 58 in the support structure 26 for remaining supports 30. Following tightening of the clamping nuts, the surface jig 66 is removed.

There will normally be four supports 30 on a rectangular reflector panel 28, or three on a triangular panel 31. However, any different number of supports 30 can be used. For example, if focussing within an individual panel is desired, a fifth support 30 is attached to the center of the panel 28. The fifth support 30 at the center is attached to the support structure 26. A curvature is applied to the panel 28 by positioning the center support 30 at a different position perpendicular to the plane of the panel 28 than that of the primary supports 30.

In the triangular reflector panel 31 embodiment, focusing of an individual reflector panel is simplified because it is inherently simpler to align a plane supported at three points than it is to align a plane supported at four points.

What is claimed is:

1. A method for attaching a support to a reflector panel comprising:
   a. a panel made of glass or other transparent rigid material, said panel having a reflective material applied to one side, said reflective material being applied to the surface that is opposite the surface that is exposed to the light being reflected;
   b. a support, said support providing means for attaching the glass panel to a support structure;
   c. an adhesive material between the reflector panel and the support, said adhesive material attaching the support to the reflector panel,
   said method involving:
      a. Removing the reflective material in the area of attachment to expose the glass surface, b. Applying the adhesive to the glass, and c. Setting the support in the adhesive whereby the support is attached by adhesive attached directly to the glass and to the support, rather than to the reflective materials and/or coatings and to the support.

2. The method of claim 1 in which the adhesive provides flexibility to the attachment between the panel and support, whereby relative movement between the panel and support places less stress on the reflector panel or the support than with a solid adhesive.

3. The method of claim 1 in which a support is added, said support being positioned such that its movement can distort the panel to provide focusing within an individual panel.

4. The method of claim 1 in which the reflective panel is triangular and has three supports attached, whereby adjustment of the panel to focus its image on a designated area is simplified.

* * * * *